S. SMITH.
Ash-Sifters.
No. 137,153. Patented March 25, 1873.
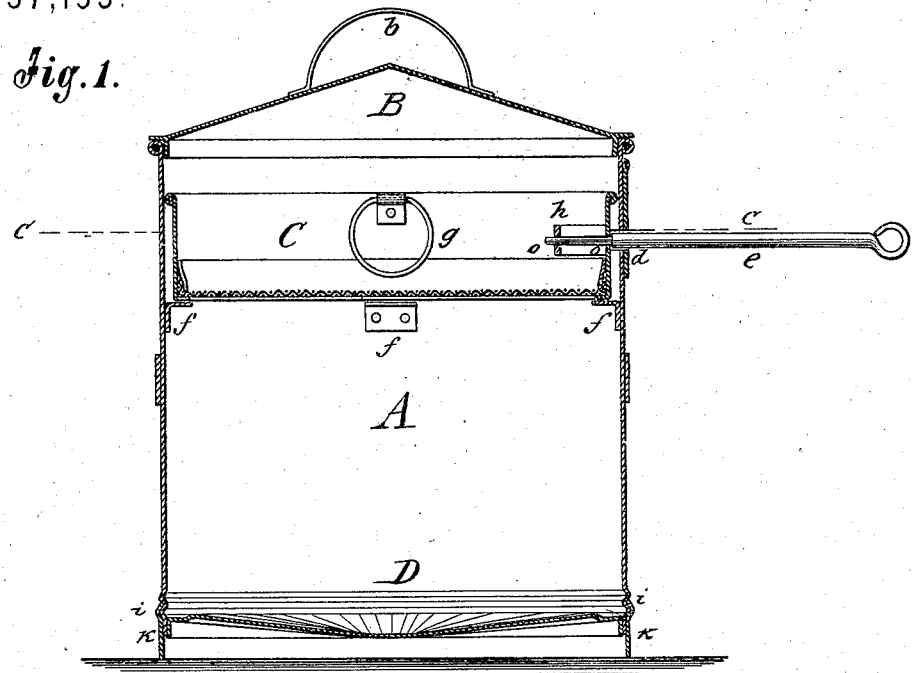
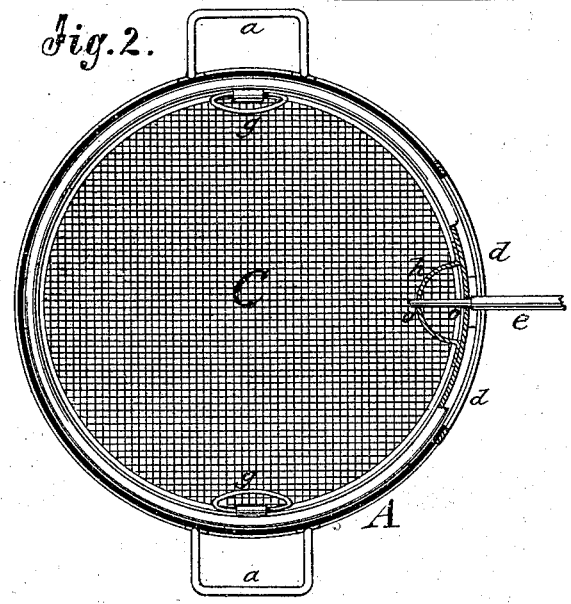 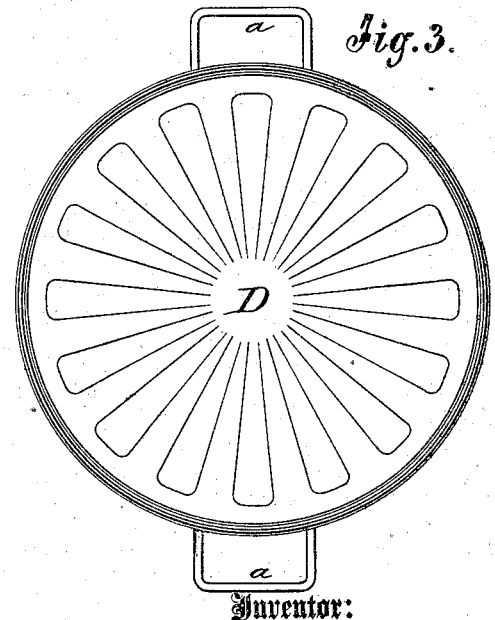
Witnesses: Inventor:

UNITED STATES PATENT OFFICE.

SAMUEL SMITH, OF BROOKLYN, NEW YORK.

IMPROVEMENT IN ASH-SIFTERS.

Specification forming part of Letters Patent No. 137,153, dated March 25, 1873.

*To all whom it may concern:*

Be it known that I, SAMUEL SMITH, of Brooklyn, in the county of Kings and State of New York, have invented a new and Improved Ash-Sifter, of which the following is a specification:

Figure 1 is a vertical section of my ash-sifter, showing the handle inserted. Fig. 2 is a horizontal transverse section on the line *c c*, Fig. 2; and Fig. 3 is a bottom view of the same.

Similar letters of reference indicate corresponding parts.

My invention proposes to furnish to the public an ash-sifter which is strong and durable in construction, and supplied with a mechanism by which the dust so annoying in sifting is entirely obviated, and at the same time the danger of fire incident to the present mode entirely avoided.

The invention consists in the improvement of ash-sifters, as hereinafter described and pointed out in the claim.

In the drawing, A represents the cylindrical vessel, made preferably of sheet-iron, which is provided with handles *a* for lifting and removing the same at pleasure, and also with a removable cover, B, and handle *b*. A horizontal slot, *d*, Fig. 2, is broken at convenient height into the vessel A to admit the insertion of the loose hand-lever *e*. Slot *d* may be stiffened by an extra thickness of sheet-iron. The inner side of the vessel A is provided with lugs *f*, which support an open cylindrical sieve, C, of nearly the same diameter as that of the inner cylinder. The bottom of the sieve is constructed in the usual manner of coarse wire-gauze. Rings *g* are applied at the inner surface of the sieve, so that the same can be lifted out and replaced, as desired. The inner side of the sieve C is further supplied with a projecting band, *h*, of semicircular shape, placed to that side of the sieve which corresponds with slot *d* of the main vessel A. Band *h* and the sieve C are supplied with holes *o*, placed so as to be at the same height with slot *d*, for the purpose of inserting the hand-lever *e*, which latter, by being reciprocally moved in guide-slot *d*, imparts this motion to the sieve C, and sifts thereby the ashes placed thereon. The bottom D is constructed of radially-corrugated sheet-iron, with a view to strengthen and brace the same toward the circumference of the sifter. The main cylinder is provided with indentations, into which the rim of the bottom D is riveted on the inner side, and the hoop or band *k* applied to the outside of the main cylinder, producing three thicknesses of sheet metal below the level of the bottom, and forming, in connection with the bracing tendency of the corrugated bottom O, a firm connection and resulting strong resistance to the strain to which the bottom part is principally exposed when handled for the purpose of carting off the ashes.

From the foregoing the method of using the sifter will be easily perceived. The main vessel is uncovered, the sieve with the ashes to be sifted placed on the lugs, the cover replaced, the hand-lever inserted through the slot into the holes provided in the sieve and projecting band, then thoroughly shaken till the pieces of coal and ashes are separated, when the hand-lever is taken out, the vessel uncovered, the sieve with the unburned coal removed, and the main vessel with the ashes placed in readiness for the carting off of the same.

Having thus described my invention, I claim as new and desire to secure by Letters Patent—

A sieve, C, provided with projecting curved perforated band *h*, a vessel, A, having slot *d*, and a loose hand-lever, *e*, combined as and for the purpose described.

SAMUEL SMITH.

Witnesses:
PAUL GOEPEL,
N. BURNS.